Patented Feb. 18, 1930

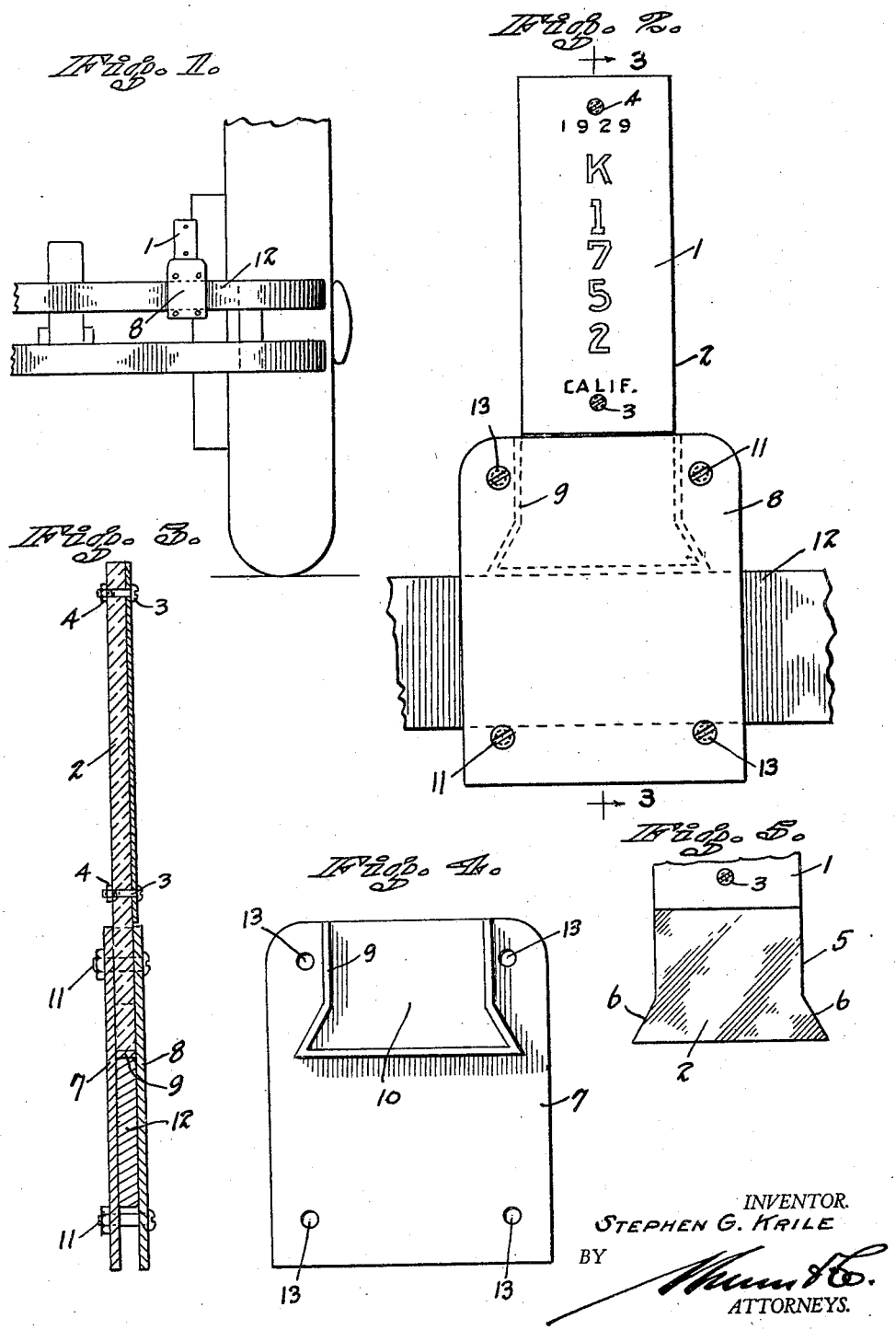

1,747,446

UNITED STATES PATENT OFFICE

STEPHEN GEORGE KRILE, OF SAN FRANCISCO, CALIFORNIA

AUTOMOBILE IDENTIFIER

Application filed February 11, 1929. Serial No. 339,110.

The present invention relates to improvements in automobile identifiers and its principal object is to provide a means which causes a motor vehicle to drop a license plate or other identifying device when it collides with another vehicle or with a person so as to make it possible for the injured party to identify the automobile causing the damage, even though the driver of the said automobile should try to escape by running away from the scene of the accident.

More particularly, it is an object of my invention to provide a frangible means for supporting the license plate or other identifying device relative to the motor vehicle so that in case of collision, the supporting means breaks and causes the identifying device to drop to the ground surface.

Further objects and advantages of my invention will appear as the specification proceeds.

The preferred form of my invention is illustrated in the accompanying drawing, in which Figure 1 shows my invention in use on the bumper of an automobile;

Figure 2 shows an enlarged front view of my identifier;

Figure 3, a vertical section taken along line 3—3 of Figure 2;

Figure 4, a detail view of one of the holding members for the frangible supporting means; and Figure 5, a fragmentary detail view of the frangible supporting means itself.

While I have shown only the preferred form of the invention, I wish to have it understood that various changes or modifications may be made within the scope of the claims hereto attached without departing from the spirit of the invention.

My invention comprises in its principal feature a license plate 1, a glass plate 2 to which the license plate is fastened by means of screws 3 and nuts 4 and which said glass plate extends beyond the license plate so as to form a foot 5 with flaring lower edges, as shown at 6, and means for fastening the glass plate to the bumper of a motor vehicle.

It should be understood, of course, that any identifying device may be substituted for the license plate 1 with the same result, and it should be further understood that while I have selected glass as the material for the supporting plate, that other frangible material might be substituted without departing from the spirit of the invention.

The means for fastening the foot of the supporting glass plate to the bumper of an automobile comprises two plates 7 and 8 similar in outline. One of these plates has a flange 9 extending from its inner face, the said flange being formed to correspond to the outline of the foot of the glass and to furnish a pocket for the same. It will be noted that the flaring portions of the foot of the glass plate are received in correspondingly-formed recesses 10 in the pocket so that after the two plates have been clamped together by means of bolts 11, the glass plate may not be withdrawn from the pocket and the only manner in which the license plate can be removed is by breaking the glass plate. The thickness of the flange 9 corresponds substantially to that of the bumper bar of the automobile shown at 12 and the bolt holes 13 are arranged in such a manner that a bumper bar may be accommodated below the flange 9 between the two plates without interfering with the insertion of the bolts 11 previously referred to.

The manner in which my invention operates should be readily understood from the foregoing description.

When the automobile strikes an object with its front or its rear, with any degree of force, the glass plate will break, particularly in view of the fact that a definite portion thereof is firmly clamped between the two plates so that only the upper portion carrying the license plate can vibrate in response to the shock received.

The breaking of the glass plate causes the license plate or other identifying device to drop to the ground so that the automobile may be identified even though the driver should choose to run away.

I claim:

1. In combination, an automobile-identifying plate, a plate of frangible material fastened thereto and extending therebeyond and means for fastening the extension to an automobile part, the said means being made to firmly clamp the extension from both sides and over the entire area thereof.

2. In combination, an automobile-identifying plate, a plate of frangible material fastened thereto and extending therebeyond, two plates adapted to be clamped from opposite sides upon said extension and a bumper bar fastened to the automobile and means for thus clamping the two plates.

3. In combination, an automobile-identifying plate having an extension made of frangible material and flaring outwardly at its far end, a metal plate having a flange rising from one face and made to form a pocket for receiving the extension, a second plate and means for fastening the second plate to the metal plate for clamping the same upon the flange, the extension and an interposed supporting bar.

STEPHEN GEORGE KRILE.